(12) United States Patent
Newsteder

(10) Patent No.: US 7,340,468 B1
(45) Date of Patent: *Mar. 4, 2008

(54) DIRECTORY INFORMATION SYSTEM FOR PROVIDING TOLL FREE TELEPHONE NUMBERS

(75) Inventor: Robert Newsteder, Elmont, NY (US)

(73) Assignee: Carole Sorell Incorporated, New York, NY (US)

( * ) Notice: Subject to any disclaimer, the term of this patent is extended or adjusted under 35 U.S.C. 154(b) by 335 days.

This patent is subject to a terminal disclaimer.

(21) Appl. No.: 11/072,191

(22) Filed: Mar. 4, 2005

Related U.S. Application Data

(63) Continuation of application No. 09/989,202, filed on Nov. 21, 2001, now Pat. No. 6,980,991.

(51) Int. Cl.
*G06F 17/30* (2006.01)
(52) U.S. Cl. ..................... 707/10; 707/104.1
(58) Field of Classification Search ............ 707/2, 707/3, 5, 6, 10, 104.1; 705/14, 26
See application file for complete search history.

(56) References Cited

U.S. PATENT DOCUMENTS 5,850,433 A * 12/1998 Rondeau ............ 379/218.01

| | | | |
|---|---|---|---|
| 5,937,390 A | 8/1999 | Hyodo | |
| 5,948,071 A | 9/1999 | Bouanaka et al. | |
| 6,052,439 A | 4/2000 | Gerszberg et al. | |
| 6,249,576 B1 | 6/2001 | Sassin et al. | |
| 6,317,723 B1 | 11/2001 | Walker et al. | |
| 2002/0078459 A1 | 6/2002 | McKay | |
| 2002/0082930 A1 | 6/2002 | Park | |
| 2002/0198933 A1 | 12/2002 | Kwak | |
| 2003/0110080 A1 | 6/2003 | Tsutani et al. | |
| 2005/0216448 A1* | 9/2005 | Talib et al. ............ | 707/3 |

* cited by examiner

*Primary Examiner*—Uyen Le
(74) *Attorney, Agent, or Firm*—Hess Patent Law Firm, P.C.; Robert J. Hess

(57) ABSTRACT

An Internet-based directory information system for providing toll free telephone numbers and other company information based on product or service advertising. First and second web sites are configured with separate first and second graphic user interfaces for the entering of company information and search request information, respectively. A database correlates entered company information (including toll free telephone number) to advertising information, compares the company-provided advertising information to a search request-provided advertising information, and formulates a search result based on matches between the search request and the company-provided advertising information.

21 Claims, 2 Drawing Sheets

DIRECTORY INFORMATION SYSTEM FOR PROVIDING TOLL FREE TELEPHONE NUMBERS

CROSS REFERENCE TO RELATED PATENT APPLICATIONS

This is a continuation of U.S. patent application Ser. No. 09/989,202 filed Nov. 21, 2001, now U.S. Pat. No. 6,980,991.

BACKGROUND OF THE INVENTION

1. Field of the Invention

The present invention relates to a system for providing toll free telephone numbers and other company information via the Internet or the telephone, and more particularly pertains to an Internet-based or telephone-based directory information system for providing toll free telephone numbers and other company information on the basis of when, where and how the companies using such numbers advertise themselves and/or their products or services.

2. Discussion of the Related Art

Internet-based and telephone-based directory information services are known. Most Internet service providers have web sites that include "yellow pages" and "white pages" directory services, whereby a visitor to the web site can enter certain information concerning an individual or business entity and obtain the address and telephone number of same. Specifically with regard to "yellow pages" directory services, a visitor enters information as to the name of the business, if known, or the type of business (i.e., hotel, restaurant, clothing store), and, optionally, the city and state in which the business is located. The visitor transmits this information to the server supporting the web site of the service provider, and the server accesses information that includes the telephone number of the business sought. The server then transmits the telephone number to the visitor. Where the visitor cannot supply the name of the business, but merely the business type and city, more than one phone number is likely to be accessed by the server and transmitted to the visitor. In such cases, the visitor may be required to sort through a large number of phone numbers to find that of the particular business in which he or she is interested. As use of the Internet to retrieve information is valued primarily for its speed and ease of use, a visitor confronted with a lengthy list of possible phone numbers is unlikely to go beyond the first three of four numbers in any list, and thus very possibly will not find the number for which he or she was searching.

This problem of excessive, essentially useless information is magnified where a site visitor's knowledge of a business is derived primarily or solely from radio or television advertising (or other advertising, such as billboards, bus and subway placards, newspapers and periodicals, skywriting, etc.) for a product or service. There, the visitor may be aware only of the advertisement and its content, viz., the name of the company, the general product or service category, the radio or television station on which the advertisement aired (or the other medium in which the advertising was presented) and the date and approximate time at which it aired (or otherwise presented). However, without the approximate geographic location of the business (at least state, if not city), the server likely will be unable to locate the desired number.

In addition to "yellow pages" directories at service provider web sites, other web sites are specifically directed to providing toll free telephone numbers of companies. At such web sites, for example, http://inter800.com, a visitor enters information on the product or service, the company name, or the toll free number, if known. Such web site directory services also regularly permit the visitor to limit his or her search to a particular state. However, a visitor to such sites still do not permit a visitor to obtain information about a company, including the company's toll free telephone number, based primarily, if not solely, on the air date, time and station (or other presentation information) of an advertisement for a product or service. That is, a visitor to either a service provider "yellow pages" directory or a toll free number web site, armed with only the air date, approximate air time, and airing station (or other presentation information) of an advertisement for a particular type of product, will be unable to obtain the toll free number (as well as other information) of the company whose ad he saw, and in whose product he was interested. Accordingly, the web site visitor will be unable to obtain information about the product, and his or her purchasing decision relative to that product likely will be adversely affected.

Telephone-based directory information systems present even greater limitations. Usually, a caller will need to provide at least a company name to obtain a toll-free number for the company. Additionally, telephone-based directory information systems provide only telephone numbers, and do not provide additional company information which the caller may desire.

What is needed is an Internet-based or telephone-based directory information system for providing toll free telephone numbers and other information of companies, where the numbers and other information are provided based primarily or solely on information from an advertisement about products or services from such companies. What is further needed is a method for providing the toll free telephone number and other information of a particular company via the Internet or a telephone-based directory service, based on the air date, approximate air time, and airing station or other presentation information of an advertisement for goods or services from such company.

Accordingly, the present invention provides an Internet-based directory information system for providing toll free telephone numbers and other information of companies, where the numbers are provided based primarily or solely on information from a television or radio advertisement for products or services from such companies. The present invention also provides a telephone-based directory information system for providing toll free telephone numbers and other information of companies, where the numbers are provided based primarily or solely on information from an advertisement for products or services from such companies.

The present invention also provides a method for providing the toll free telephone number and other information of a company via the Internet or telephone based on the air date, approximate air time, and airing station or other presentation information of an advertisement for goods or services from that company.

BRIEF SUMMARY OF THE INVENTION

The Internet-based directory information system of the present invention comprises a database of information from companies advertising on radio or television or in other media, and who also use toll free telephone numbers; a first Internet web site configured with a first graphic user interface so that a company visiting the web site may enter information relating to its advertising and products or services, including a toll free telephone number and information relating to radio or television or other advertising for products and services of the company; a first data network through which the information entered at the first web site is transmitted to the database; a second Internet web site configured with a second graphic user interface so that a visitor to the web site may frame a search request for a toll free telephone number or other company information based on information taken from radio or television or other advertising for a product or service; and a second data network through which the search request is transmitted to the database and the toll free number and other company information subsequently is transmitted to the second web site.

In a preferred embodiment, the database is organized to correlate the toll free telephone number and other information of a particular company to the advertising media format, advertising date, approximate air time (where appropriate), name of publication(s) showing the advertising (where appropriate), airing station (where appropriate), and geographic location of radio or television or other media advertising of a company's products or services. The first graphic user interface (at the first web site) allows a company to enter such information, as well as other information, such as company name, the company's toll free telephone number, the company's business address, a description of the company's products or services, and whether promotional or other offers are included with the products or services, for inclusion on the database. A company may also provide a re-creation of the advertising, as well as a hyperlink for accessing the company's own web site (where appropriate), the URL (address) of the site, and the ability to purchase the products or services. This last may take the form of an aspect of the company's web site, or may take the form of a switchboard of telephone operators able to take orders for the products or services.

The second graphic user interface (at the second web site) allows search requests to be framed based on the media format, advertising date, approximate air time (where appropriate), publication name (where appropriate), airing station (where appropriate) and geographic location of the advertising. The second graphic user interface further allows additional information to be included in the search request, such as the name of the company, the nature of the product or service, and whether the product or service is the subject of a promotional or other offer. Such additional information has the effect of narrowing the search request.

In a further preferred embodiment, the directory information system is telephone-based. In this embodiment, the second web site configured with a second graphic user interface is replaced by a telephone-based directory service with a voice/button caller interface configured to allow a caller to the telephone-based directory service to frame a search request for a toll free telephone number or other company information based on information taken from radio or television or other media advertising for a product or service. Further in this embodiment, the voice/button caller interface allows a search request to be framed based on the media format, advertising date, approximate air time (where appropriate), publication name (where appropriate), airing station (where appropriate) and geographic location of the advertising. The voice/button caller interface further allows additional information to be included in the search request, such as the name of the company, the nature of the product or service, and whether the product or service is the subject of a promotional or other offer. Such additional information has the effect of narrowing the search request.

The present invention also provides a method of providing toll free telephone numbers and other company information via the Internet. According to the method, a first Internet web site is provided having a first graphic user interface configured to allow company information, including a toll free telephone number, company name, company address, products or services, promotional or other offers tied to the products or services, and advertising information, namely, media format, advertising date, approximate air time (where appropriate), publication name (where appropriate), airing station (where appropriate) and geographic location of the advertising, to be entered. Where appropriate, the company information also includes a re-creation of the advertising, a hyperlink for accessing the company's own Internet web site, the Internet address of the web site, and the ability to purchase the products or services. The ability to purchase products or services may take the form of an aspect of the company's web site configured to allow the products or services to be purchased, or may take the form of a switchboard of telephone operators able to take orders for the products or services. The entered company information and advertising information are transmitted to a database via a first data network, the database being organized to correlate the transmitted company information to the transmitted advertising information.

A second Internet web site is provided having a second graphic user interface configured to allow a search request for a toll free telephone number and other information about a company to be framed by entering the media format in which the advertising appeared, the date the of advertising for products or services by the company, the approximate air time of the advertising (where appropriate), the name of the publication printing the advertising (where appropriate), the airing station of the advertising (where appropriate), and the geographic location where the advertising was observed. The search request is transmitted via a second data network to the database, where the search request is compared with the entered, transmitted advertising information to find a match therebetween. Where a match is found, the matched advertising information is correlated with corresponding company information, and the corresponding company information is accessed from the database and transmitted over the second data network to the second web site.

The present invention also provides a method of providing toll free telephone numbers and other company information via a telephone-based directory service. According to the method, an Internet web site is provided having a graphic user interface configured to allow company information, including a toll free telephone number, company name, company address, products or services, promotional or other offers tied to the products or services, and advertising information, namely, media format, advertising date, approximate air time (where appropriate), publication name (where appropriate), airing station (where appropriate) and geographic location of the advertising, to be entered. Where appropriate, the company information also includes a re-creation of the advertising, a hyperlink for accessing the company's own Internet web site, the URL (address) of the web site, and the ability to purchase the products or services. As with the Internet-based system, this may take the form of an aspect of the company's web site configured to allow the products or services to be purchased, or may take the form of a switchboard of telephone operators able to take orders for the products or services. The entered company information and advertising information are transmitted to a database via a first data network, the database being organized to correlate the transmitted company information to the transmitted advertising information.

A telephone-based directory service is provided having a voice/button caller interface configured to allow a search request for a toll free telephone number and other information about a company to be framed by providing the media format, the advertising date, the approximate air time of the advertising (where appropriate), publication name showing the advertising (where appropriate), airing station of the advertising (where appropriate), and geographic location of the advertising. The search request is transmitted via a second data network to the database, where the search request is compared with the entered, transmitted advertising information to find a match therebetween. Where a match is found, the matched advertising information is correlated with corresponding company information, and the corresponding company information is accessed from the database and transmitted over the second data network to the telephone-based directory service to the user.

DETAILED DESCRIPTION OF THE INVENTION

Figure 1:
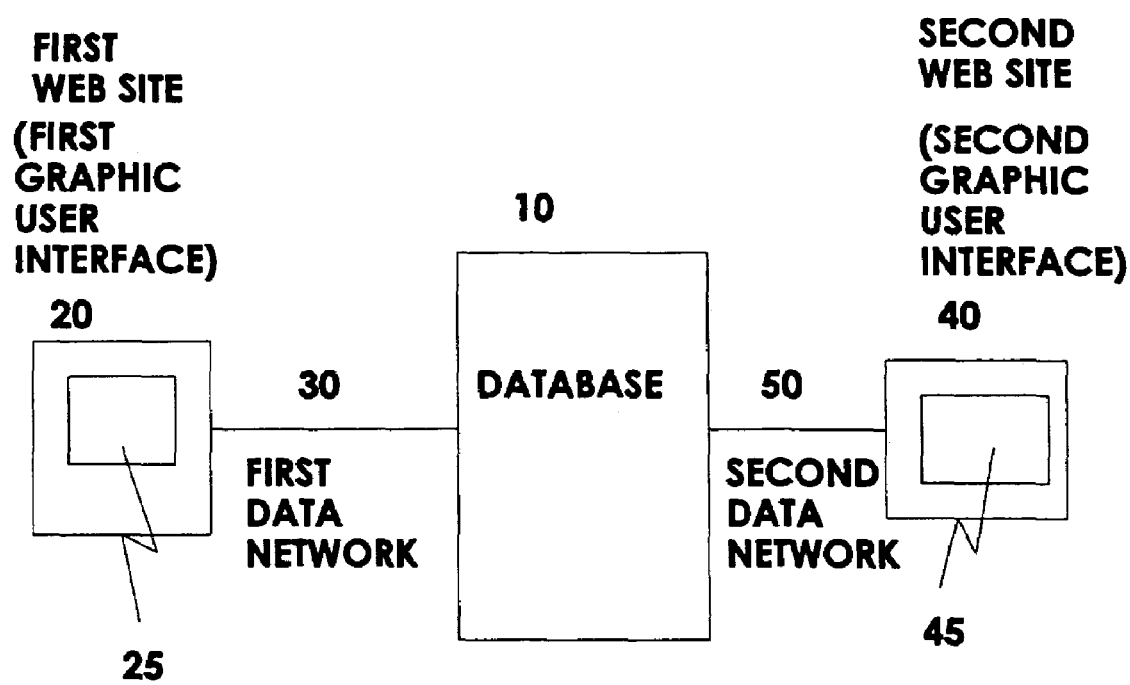
FIG. 1 is a block diagram of the Internet-based directory information system of the present invention.
Figure 2:
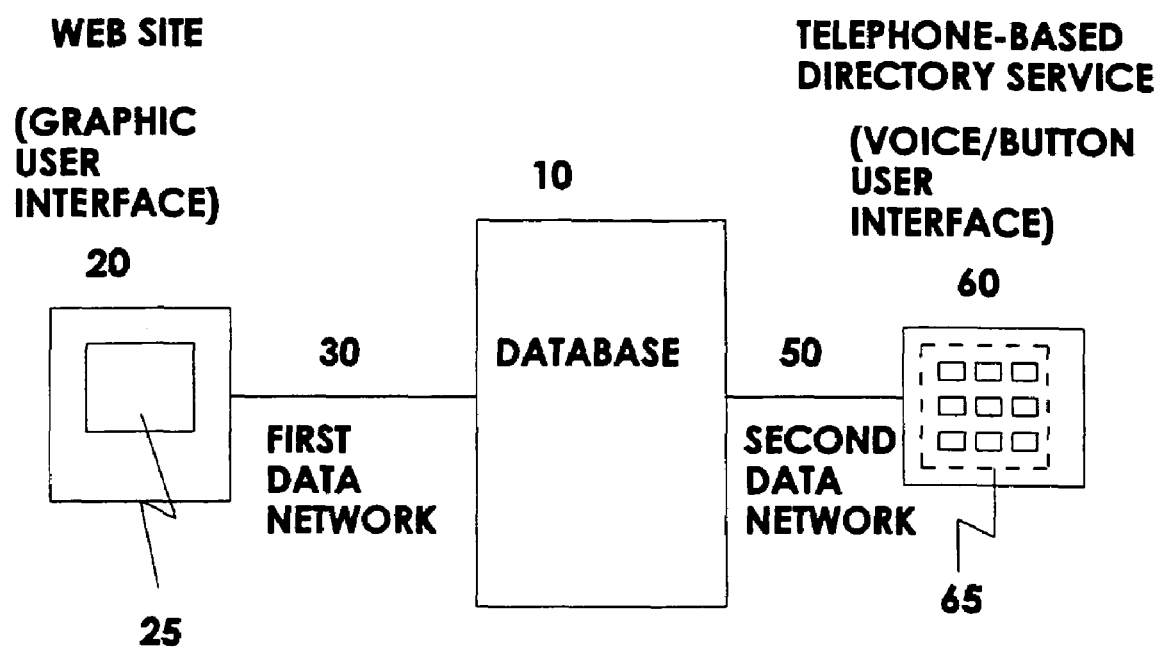
FIG. 2 is a block diagram of the telephone-based directory information system of the present invention.

The present invention provides an Internet-based directory information system for providing toll free telephone numbers and other company information based on the air date, approximate air time, and airing station of advertising for products or services from the company. The directory information system includes a database 10 of information from companies advertising on radio or television and also having toll free telephone numbers; a first, adjunct Internet web site 20 having a first graphic user interface 25 through which a company is able to enter information relating to its advertising and products or services for inclusion on the database; a first data network 30 linking the adjunct web site 20 with the database 10; a second principal web site 40 having a second graphic user 45 interface through which a site visitor can frame a search request for the toll free number of a company based on radio or television (or other) advertising of a product or service; and a second data network 50 linking the principal web site 40 with the database 10.

The database 10 is configured and organized so that a company's toll free telephone number and other information is correlated to information relating to that company's radio or television (or other) advertising for its products or services. Specifically, the company information (including toll free telephone number) is correlated to the media format, advertising date, approximate air time (where appropriate), publication name (where appropriate), airing station (where appropriate) and geographic location of the advertising. Company information, in addition to the toll free telephone number and advertising information, that can be included on the database 10, includes, but is not limited to, the company's name and address, the products or services provided by the company, promotional or other offers related to the products or services, a re-creation of the advertising, a hyperlink for accessing the company's Internet web site, the URL (address) of the web site, and the ability to purchase the products or services. This last can take the form of an aspect of the company's web site configured to allow purchasing the products or services, or may take the form of a switchboard of telephone operators able to take orders for the products or services.

The adjunct web site 20 is configured with a graphic user interface 25 that allows a company to enter the following information: company information, including company name, company address, company toll free telephone number, company products or services, and promotional or other offers tied to such products or services, the URL of the company's web site, a hyperlink to the web site, and (where appropriate) access to a switchboard of telephone operators able to take orders for the products or services; and advertising information, namely, media format (i.e., radio, television, newspapers, periodicals, bus placards, subway placards, billboards), advertising date, approximate air time (where appropriate), publication name (where appropriate), airing station (where appropriate) and geographic location of the advertising.

The adjunct web site 20 permits a company to update its company information and advertising information as warranted.

The principal web site 40 is configured with a separate graphic user interface 45 that allows a visitor to enter a search request for company and/or product or service information based solely on information relating to product or service advertising. That is, a search request can be framed and entered with the following information: media format, advertising date, approximate air time (where appropriate), publication name (where appropriate), airing station t (where appropriate) and geographic location of the advertising.

The principal web site 40 user interface 45 allows a visitor to narrow his or her search results by entering additional information into the search request, such as company name, company location, nature of the products or services, and promotional or other offers tied to the products or services. However, only the media format, advertising date, approximate air time (where appropriate), publication name (where appropriate); airing station (where appropriate) and geographic location of the advertising are required to be entered in order to perform the search.

Company information and advertising information are transmitted from the adjunct web site 20 to the database 10 via a first data network 30. Search request information is transmitted from the principal web site 40 to the database 10 via a second data network 50. Search results subsequently are transmitted from the database 10 to the principal web site by this same network 50.

In an alternative embodiment, the directory information system of the present invention may be telephone-based. In this embodiment, the database 10, adjunct web site 20 with first graphic user interface 25 and first data network 30 are unchanged from the Internet-based system. The principal web site 40 and second graphic user interface 45 are replaced by a telephone-based directory service 60 configured with a voice/button caller interface 65.

As with the principal web site 40 and second graphic user interface 45, the voice/button caller interface 65 at the telephone-based directory service 60 allows a caller to enter a search request for company and/or product or service information based solely on information relating to product or service advertising. The caller provides the following information, in a preferred embodiment in response to automated voice prompts: the media format of the advertising, the advertising date, approximate air time of the advertising (where appropriate), the publication name showing the advertising (where appropriate), the airing station (where appropriate) and the geographic location of the advertising.

The directory information service caller interface 65 allows a caller to narrow his or her search results by supplying additional information into the search request (in a preferred embodiment, in response to additional automated voice prompts), such as company name, company location, nature of the products or services, and promotional or other offers tied to the products or services. However, the media format, advertising date, approximate air time (where appropriate), publication name (where appropriate), airing station (where appropriate) and geographic location of the advertising are required to be provided in order to perform the search.

Further in this embodiment, company information and advertising information still are transmitted from the web site 20 to the database 10 via a first data network 30. Search request information is transmitted from the telephone-based directory service to the database 10 via a second data network 50. Search results subsequently are transmitted from the database 10 to the telephone-based directory service 60 by this same network 50.

The method of using the directory information system of the present invention comprises the following steps:

1. A company visiting the first, adjunct web site 20 uses the first graphical interface 25 there provided to enter the following information: company information, namely, company name, company address, company toll free telephone number, company products or services, whether there are promotional or other offers tied to the product or services, URL (address) of the company's Internet web site, a hyperlink to the web site, and the ability to purchase the products or services, either as an aspect of the web site or as a switchboard of telephone operators able to take orders for the products or services; and advertising information, namely, the format of relevant advertising for the products or services (that is, radio, television, newspapers, periodicals, placards, billboards), the air date(s) of the advertising (including, in a preferred embodiment, start date and end date), the approximate air time of the advertising (where appropriate), the name of the publication (where appropriate), the identity (including, in a preferred embodiment, geographic location) of the airing stations (where appropriate), and the geographic location in which the advertising was observed.

2. The entered company information and advertising information are transmitted via the first data network 30 to the database 10.

3. The database 10 organizes the transmitted company information and advertising information so that the advertising information will correlate to the other company information. The advertising information is further configured and arranged at the database 10 so that it can be compared to search requests received via the second data network 50.

4. A user visiting the second, principal web site 40 and seeking information regarding a company (including a toll free telephone number) or products or services of the company, based on an advertisement that the user has heard/seen, uses the second graphic interface 45 to frame a search request by entering the following information: media format in which the advertising appeared, date of the advertisement, approximate air time of the advertisement (where appropriate), name of the publication in which the advertising appeared (where appropriate), the identity (including, in a preferred embodiment, the geographic location) of the airing station (where appropriate), and the geographic location in which the advertising was observed. Optionally, the user may also enter additional information to narrow the search request, including, without limitation, company name, nature of the products or services, and whether promotional or other offers are tied thereto. However, only the advertising information is required.

4a. Alternatively, a caller calling the telephone-based directory service 60 and seeking the same or similar information, based on an advertisement that the caller has heard/seen, uses the voice/button user interface 65 to frame a search request by providing the following information (in a preferred embodiment, in response to automated voice prompts): media format in which the advertising appeared, date of the advertisement, approximate air time of the advertisement (where appropriate), name of the publication in which the advertising appeared (where appropriate), the identity (including, in a preferred embodiment, the geographic location) of the airing station (where appropriate), and the geographic location in which the advertising was observed. Optionally, the caller may also provide additional information to narrow the search request (in a preferred embodiment, also in response to automated voice prompts), including, without limitation, company name, nature of the products or services, and whether promotional or other offers are tied thereto. However, only the advertising information is required. In this embodiment, the caller is prompted for confirmation of the provided information after each item of the information is provided.

5. The request is transmitted by the second data network 50 to the database 10.

6. The database 10 receives the transmitted search request and compares it with the advertising information provided by those companies making use of the database. Where company-provided advertising information matches the search request, the company-provided advertising information is correlated with the other available company information, and that other available company information (including toll free telephone number) is accessed and included in the search result.

7. Once all the other available company information to be included in the search result is so included, the search result is transmitted by the second data network 50 to the second, principal web site 40, or alternatively, the telephone-based directory service 60.

By way of illustration, Company X, which manufactures widgets, advertises same via radio and television. Company X enters the following information at the adjunct web site 20, using the graphic interface 25 there provided: company information, namely, company name, company location, toll free telephone number, nature of its products (here, widgets), promotional or other offers tied to the products (here, buy one get one free), the URL of the company's web site (www.companyx.com), a hyperlink to that site, and a switchboard of telephone operators standing by to take orders for the products; and advertising information, namely, the media format in which its advertising appears (in this case, television), the air date of the advertising (here, January 1-31), the names of publications showing the advertising (here, none), the approximate air time of the advertising (9:00 P.M.), the airing stations (here, including KZZZ-TV), and the geographic location in which the advertising was shown (here, Pomona, Calif.). The entered company information and advertising information are transmitted via the first data network 30 to the database 10, where the transmitted information organized to correlate the transmitted company information with the transmitted advertising information.

Subsequently, a user, having seen a television ad for widgets at approximately 9:00 P.M. on January 15, on station KZZZ-TV in Pomona Calif., and interested in learning more about the product or company, visits the principal web site 40. Using the graphic interface 45 at the web site 40, the user formulates a search request by entering the media format of the advertisement, the date of the advertisement, the approximate air time (where appropriate), the name of the publication showing the ad (where appropriate) the airing station, and the geographic location in which the advertising was observed. The user also may enter a description of the product, as well as information relating to the name of the company or promotional or other offers ties to the product, but this is not essential. The entered search request is transmitted via the second data network 50 to the database 10. The database 10 takes the search request and compares it against the available company information. Companies whose advertising information matches that of the search request are identified by the database, and their other company information is included in the search results, and transmitted via the second data network 50 to the principal web site 40.

Alternatively, the user/caller calls the telephone-based directory service 60 and, using the voice/button user interface 65, provides the same information as is provided via the second graphic user interface 45 at the principal web site 40, preferably in response to automated voice prompts. Here, the caller is prompted to confirm each item of information provided. By way of example, the voice/button interface includes an automated voice prompt for media format. If the caller says "television," the confirmation prompt says "You said 'television.' If this is correct, press one. If this is not correct, press two." In the latter case, the caller re-provides the format information.

The search results are transmitted via the second data network 50 to the telephone-based directory service.

If the user/caller does not enter/provide a description of the product (or service), the search results may include information (including toll free telephone number) on more than one company. However, because the search request expressly identifies the media format of the advertisement, the date of the advertisement, and the geographic location where the advertisement appeared, the search results will not be excessively lengthy.

While the invention has been described with respect to certain specific embodiments, it will be appreciated that many modifications and changes may be made by those skilled in the art without departing from the invention. It is intended, therefore, by the appended claims to cover all such modifications and changes as may fall within the true spirit and scope of the invention.

What is claimed is:

1. A directory information system for providing company information, comprising a database configured to correlate company information with media advertising for a product or service; an interface configured to allow a visitor to frame a search request for the correlated company information based upon the media advertising and to search within the database to identify a match as between the framed search request and the media advertising to identify the correlated company information as a result of the search.

2. The directory information system of claim 1, wherein the company information is a toll free number and other company information.

3. The directory information system of claim 1, wherein the search request is an entry selected from a group consisting of a media format of the media advertising, a date of the media advertising, and a geographic location where the media advertising was observed.

4. The directory information system of claim 1, comprising: a database of information from companies who use the media advertising and who also use toll free telephone numbers; an Internet web site configured with a graphic user interface so that a company visiting the Internet web site may enter information relating to advertising and products or services of the company, including a toll free telephone number, and also may enter other company information; a first data network through which the information entered at the Internet web site is transmitted to the database; a configuration configured with the interface that allows a visitor to frame a search request for the toll free telephone number or the other company information based on information taken from the media advertising for the product or service; and a second data network through which the search request is transmitted to the database and the toll free number and other company information subsequently is transmitted to the configuration.

5. The directory information system of claim 4, where the database is further configured and arranged to correlate the toll free telephone number and other company information to information relating to an advertising media format, an advertising date, an identity of advertising publications, an approximate air time, an airing station, and a geographic location of advertising of products or services by the company.

6. The directory information system of claim 5, where the advertising media format is one or more of television, radio, newspapers, periodicals, bus placards, subway placards, and billboards.

7. The directory information system of claim 4, where the first graphic user interface at the first web site is further configured to allow a company to enter company information, namely, a company name, company address, company toll free telephone number, a description of the company's products or services, information relating to promotional or other offers tied to the products or services, address of the company's Internet web site, a hyperlink to the company's Internet web site, and access to a switchboard of telephone operators able to take orders for the products or services; and advertising information, namely, advertising media format, date of advertising for the products or services, approximate air time of advertising, names of publication showing the advertising, airing stations, and geographic location of the advertising, for transmittal via the first data network to and inclusion in the database.

8. The directory information system of claim 4, wherein the configuration is a further Internet web site and the interface configured to allow the visitor to frame the search request is a graphical user interface.

9. The directory information system of claim 4, wherein the configuration is a telephone-based directory service and the interface configured to allow the visitor to frame the search is a voice/button caller interface.

10. The directory information system of claim 4, where the interface configured to allow the visitor to frame a search request for a toll free telephone number and other company information taken from media advertising for a product or service is further configured to frame the search request for a toll free telephone number and other company information or information about a product or service, through entry of a media format of the media advertising, a date of the media advertising, and a geographic location where the media advertising was observed.

11. The directory information system of claim 10, where the interface configured to frame a search request for a toll free telephone number and other company information taken from media advertising for a product or service is further configured to allow the visitor to frame the search request through entry of an air time of the media advertising and an airing station of the media advertising.

12. The directory information system of claim 10, where the interface configured to frame a search request for a toll free telephone number and other company information taken from media advertising for a product or service is further configured to allow the visitor to frame a search request through entry of a name of a publication showing the media advertising.

13. The directory information system of claim 10, where the interface is further configured to allow the visitor to frame a narrower search request for a toll free telephone number or other information about a company or a product or service through an entry selected from a group consisting of company name, nature of the product or service, and whether the product or service is tied to a promotional or other offer.

14. A method of providing company information via a directory information service, comprising correlating company information with media advertising for a product or service; providing an interface configured to allow a visitor to frame a search request for the correlated company information based upon the media advertising t and to search within a database to identify a match as between to the framed search request and the media advertising to identify the correlated company information as a result of the search.

15. The method of claim 14, wherein the company information is a toll free number and other company information.

16. The method of claim 14, further comprising providing the search request as an entry selected from a group consisting of a media format of the media advertising, a date of the media advertising, and a geographic location where the media advertising was observed.

17. The method of claim 15, comprising: providing an Internet web site having a graphic user interface configured to allow company information, including a toll free telephone number, company name, company address, products or services, promotional or other offers tied to the products or services, Internet address of the company's web site, a hyperlink to the web site, and access to a switchboard of telephone operators able to take orders for the products or services; and advertising information, namely, media format of advertising for the products or services, date of the advertising, approximate air time of the advertising, names of publications showing the advertising, airing stations showing the advertising, and geographic location in which the advertising was shown, to be entered; transmitting the entered company information and advertising information to a database via a first data network; organizing the database to correlate the entered, transmitted company information to the entered, transmitted advertising information; providing a configuration having the interface configured to allow a visitor to frame a search request for a toll free telephone number and other information about a company through entry of the media format of media advertising for products or services by the company, a date of the media advertising, and a geographic location of the media advertising; transmitting the search request via a second data network to the database; comparing the search request with the entered, transmitted advertising information to find a match therebetween; where a match is found, correlating the matched entered, transmitted advertising information with corresponding entered, transmitted company information; accessing the corresponding entered, transmitted company information from the database; and transmitting the corresponding entered, transmitted company information over the second data network to the second web site.

18. The method of claim 17, wherein the step of providing the configuration further includes framing the search request through entry of an approximate air time of the media advertising and an airing station of the media advertising.

19. The method of claim 17, wherein the step of providing the configuration further includes framing the search request through entry of a name of a publication showing the media advertising.

20. The method of claim 17, wherein the configuration is a further Internet web site and the interface configured to allow the visitor to frame the search request is a graphical user interface.

21. The method of claim 17, wherein the configuration is a telephone-based directory service and the interface configured to allow the visitor to frame the search is a voice/button caller interface.

* * * * *